Patented Jan. 14, 1941

2,228,741

UNITED STATES PATENT OFFICE 2,228,741

CAPILLARY-ACTIVE COMPOSITION

Georg Wiegand, Berlin-Grunau, Germany, assignor to the firm Chemische Fabrik Grunau, Landshoff & Meyer Akt. Ges., Berlin, Germany, a company of Germany No Drawing. Application May 3, 1937, Serial No. 140,429. In Germany May 6, 1936

2 Claims. (Cl. 252—311)

The invention relates generally to capillary-active substances and methods for their preparation. In its more specific aspects the invention has reference to capillary-active compositions which contain substituted high molecular split-off products of albumin and are particularly adapted for application as assistants in the textile and leather industry.

It is known that high molecular split-off products of albumin being colloidally soluble in water have been put to a great variety of uses, particularly in view of the protective effects they are able to produce on fibrous materials. By introducing hydrophobic residues into the amino- or imino-groups of the high molecular split-off products of albumin, capillary-active effects also can be imparted to the said products.

In Sommer Patent No. 2,015,912, issued October 1, 1935, there have been described some representatives of this class of compounds, viz. high molecular split-off products of albumin being substituted at the nitrogen atom by fatty acid radicals.

In my co-pending application Serial No. 45,370, filed the 16th of October, 1935, now issued as Patent No. 2,119,872 of June 7, 1938, I have described high molecular split-off products of albumin being substituted at the nitrogen atom by an alkyl radical which, in turn, is substituted at the nitrogen atom by an alkyl radical which, in turn, is substituted by an aromatic radical. These compounds, in addition to the colloidal properties inherent in the high molecular split-off products of albumin, also show capillary-active properties.

Other hydrophobic residues introduced into the amino- or imino-groups of the high molecular split-off products of albumin likewise impart capillary-active properties to said products. As an example, there may be mentioned the introduction of fatty alcohol residues which is effected by first preparing the chloro formate of the respective fatty alcohol and then reacting said chloro formate with the high molecular split-off products of albumin. The introduction of aromatic sulfonic acid residues into the high molecular split-off products of albumin gives similar results. It is effected by reacting the corresponding sulfonic acid halides, e. g., toluene sulfochloride, with the high molecular split-off products of albumin.

In the above mentioned substituted high molecular split-off products of albumin, all the amino- or imino-groups can be substituted by the residues mentioned, or it will be sufficient to substitute only part of the amino- or imino-groups by said residues.

It is an object of the present invention to increase the capillary-active effects of the high molecular split-off products of albumin which are substituted in the amino- or imino-groups by the hydrophobic residues mentioned above. According to my invention the increase of the capillary-active effects is produced by incorporating with the aforementioned derivatives of high molecular split-off products of albumin organic compounds being insoluble or sparingly soluble in water and containing at least one hydroxy group in the molecule. Among such organic compounds which are insoluble or sparingly soluble in water and contain at least one hydroxy group the following are mentioned particularly:

Saturated or unsaturated aliphatic alcohols containing four or more carbon atoms
Aromatic alcohols
Hydroaromatic alcohols
Terpene alcohols and their derivatives.

It is understood that the organic compounds used according to my invention do not include the esters of polyvalent alcohols with fatty acids containing free hydroxyl groups.

The invention also covers capillary-active compositions which comprise more than one of the above mentioned high molecular split-off products of albumin being substituted by hydrophobic residues, and more than one of the organic compounds being insoluble or sparingly soluble in water and containing at least one hydroxy group.

The ratio in which the individual components are mixed to produce the capillary-active compositions in accordance with this invention may be varied within wide limits. As a rule, it will be sufficient to add to the above mentioned high molecular split-off products of albumin which are substituted by hydrophobic residues, a comparatively small quantity of the organic compound being insoluble or sparingly soluble in water and containing at least one hydroxy group.

Whether the individual components of the compositions according to this invention react with each other to form molecular compounds, cannot be decided. It is a fact, however, that the said compositions have properties which cannot be deduced additively from the properties of the individual components. In other words, the effect of the compositions forming the subject matter of the present invention is not merely the additive effect of the constituents. The emulsifying power of the compositions in accordance with this invention, for instance, is considerably higher than could be predicted from the emulsifying power of the individual components when acting separately.

Furthermore, the emulsions prepared by means of the capillary-active compositions according to this invention show a surprisingly good stability.

In the following examples I have set forth in detail several capillary-active compositions in accordance with my invention, together with a wide variety of applications to which the said compositions may be put. These examples are presented only for purposes of illustration and are not to be regarded as limitations. The parts are by weight.

*Example I*

3500 parts of a 50% solution of sodium oleyl lysalbinate are mixed with 150 parts of methyl cyclohexanol and 60 parts of oleyl alcohol. To this mixture there are added, while stirring, 1500 parts of vaseline oil. A homogeneous, clear, and permanently stable solution is obtained which can be dissolved in water to form a highly disperse mineral oil emulsion that is stable towards calcium, magnesium, and chromium salts. The emulsion is useful as a greasing agent for leather, peltry, and textile fabrics.

When the addition of methyl cyclohexanol or oleyl alcohol, respectively, is omitted, a solution will be obtained which is neither homogeneous nor clear, and which, upon diluting with water, will furnish a mineral oil emulsion of considerably lower dispersity.

*Example II*

100 parts of a 50% solution of a condensation product of high molecular split-off products of albumin with soya fatty acid are melted with 30 parts of cetyl alcohol, 20 parts of Japan wax, 20 parts of cyclohexanol, 200 parts of paraffin wax and allowed to cool. The product forms a homogeneous and permanently stable mass of wax-like consistence; when re-melted it is soluble in hot water to form a disperse emulsion. The product is used as an admixture to finishing and sizing preparations for the textile industry. Being stable towards magnesium sulfate the solutions of the product may also be used for weighting finishes.

When cetyl alcohol and cyclohexanol are omitted from the above formula, a preparation will be obtained which is neither stable nor homogeneous and which will furnish an aqueous emulsion of considerably lower dispersity.

*Example III*

80 parts of a 50% solution of the condensation product of high molecular split-off products of albumin and benzyl chloride are mixed with 20 parts of benzyl alcohol to form a practically clear solution which is soluble in water. The aqueous solution has a considerably higher wetting power than have corresponding solutions of the parent materials. The product is used as a wetting agent in the bleaching of textile fabrics.

*Example IV*

60 parts of a 50% solution of the condensation product of high molecular split-off products of albumin with oleyl chloro formate are mixed with 40 parts of pine oil. The mixture is clearly soluble in water. The solution will produce better wetting and equalizing effects than do the parent materials.

The product can be used, for instance, as an equalizing agent in the dyeing of textile fabrics, or for incorporation as a wetting agent in insecticides.

*Example V*

90 parts of a condensation product of high molecular split-off products of albumin with toluene sulfochloride are mixed with 10 parts of 2,2 - methylpentamethylene - 4 - oxymethyl-dihydrodioxol. The product is clearly soluble in caustic soda solution of 30° Baumé. The solution shows better wetting properties than do corresponding solutions of the parent materials per se. The product is used as a wetting agent in the mercerization of raw cotton yarn.

The alcoholic component of the above mixture may be substituted by amyl alcohol or benzyl alcohol.

What I claim is:

1. An aqueous dispersion for the treatment of textiles, leather and the like comprising a dispersed substance and a capillary-active composition, the latter consisting essentially of a water solution of a mixture of a major proportion of a high molecular weight decomposition product of an albumin which is substituted in at least one of the amino- or imino-groups by an organic hydrophobic residue with a minor proportion of an unesterified free higher alcohol having at least four carbon atoms which is substantially insoluble in water and having at least one OH group, said alcohol being present in sufficient amount to substantially increase the capillary-active effects of said substituted albumin, said components mutually affecting each other so that the emulsifying power of the mixture is substantially greater than the sum of the effects of said components separately, said composition being adapted to emulsify difficultly emulsifiable substances to form emulsions having a high degree of stability.

2. An aqueous dispersion for the treatment of textiles, leather and the like comprising a dispersed substance and a capillary-active composition, the latter consisting essentially of a water solution of a mixture of a major proportion of a high molecular weight decomposition product of an albumin which is substituted in at lesat one of the amino- or imino-groups by an organic hydrophobic residue with a minor proportion of an unesterified free higher alcohol having at least four carbon atoms, being substantially insoluble in water and having at least one OH group, said alcohol taken from the class consisting of saturated and unsaturated aliphatic alcohols of more than 4 carbon atoms and insoluble in water, hydroaromatic alcohols, aromatic alcohols and terpene alcohols, said alcohol being present in sufficient amount to substantially increase the capillary-active effects of said substituted albumin, said components mutually affecting each other so that the emulsifying power of the mixture is substantially greater than the sum of the effects of said components separately, said composition being adapted to emulsify difficultly emulsifiable substances to form emulsions having a high degree of stability.

GEORG WIEGAND.